May 13, 1930.  M. LOUGHEAD ET AL  1,758,671

PRESSURE MECHANISM FOR BRAKE SYSTEMS

Filed Nov. 12, 1926  2 Sheets-Sheet 1

Inventors
Malcolm Loughead
and Erwin F. Loweke
Williams, Bradbury,
McCaleb & Hinkle Attys.

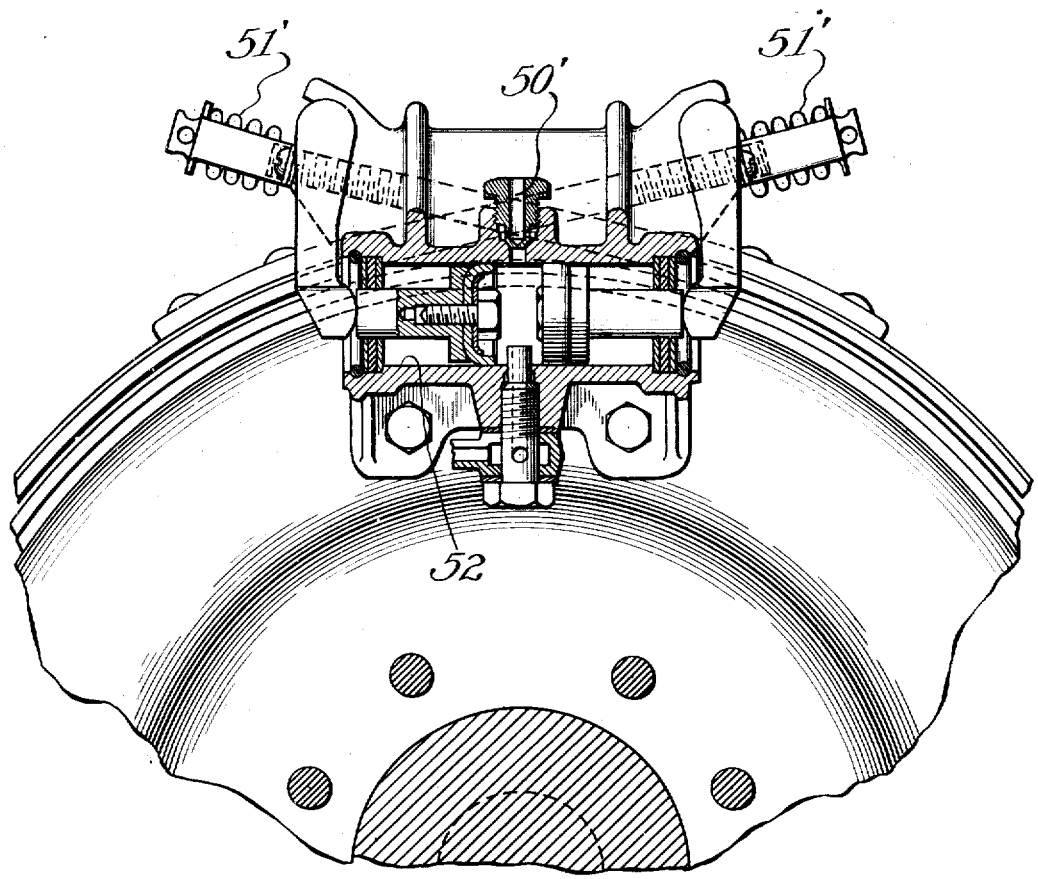

Patented May 13, 1930

1,758,671

UNITED STATES PATENT OFFICE

MALCOLM LOUGHEAD AND ERWIN F. LOWEKE, OF DETROIT, MICHIGAN, ASSIGNORS TO HYDRAULIC BRAKE COMPANY, OF DETROIT, MICHIGAN, A CORPORATION OF CALIFORNIA

PRESSURE MECHANISM FOR BRAKE SYSTEMS

Application filed November 12, 1926. Serial No. 147,860.

This invention relates to the fluid supply means for a fluid-operated brake system using a non-compressible liquid as the fluid.

The general objects of the invention are to replenish the liquid system automatically to compensate for any volumetric deficiencies or excesses in the liquid system and to prevent the ingress of air or other compressible fluid by providing a liquid seal for the master cylinder piston and by continually maintaining a slight positive pressure on the remainder of the system, and to provide means for bleeding the system of air.

Figure 1:
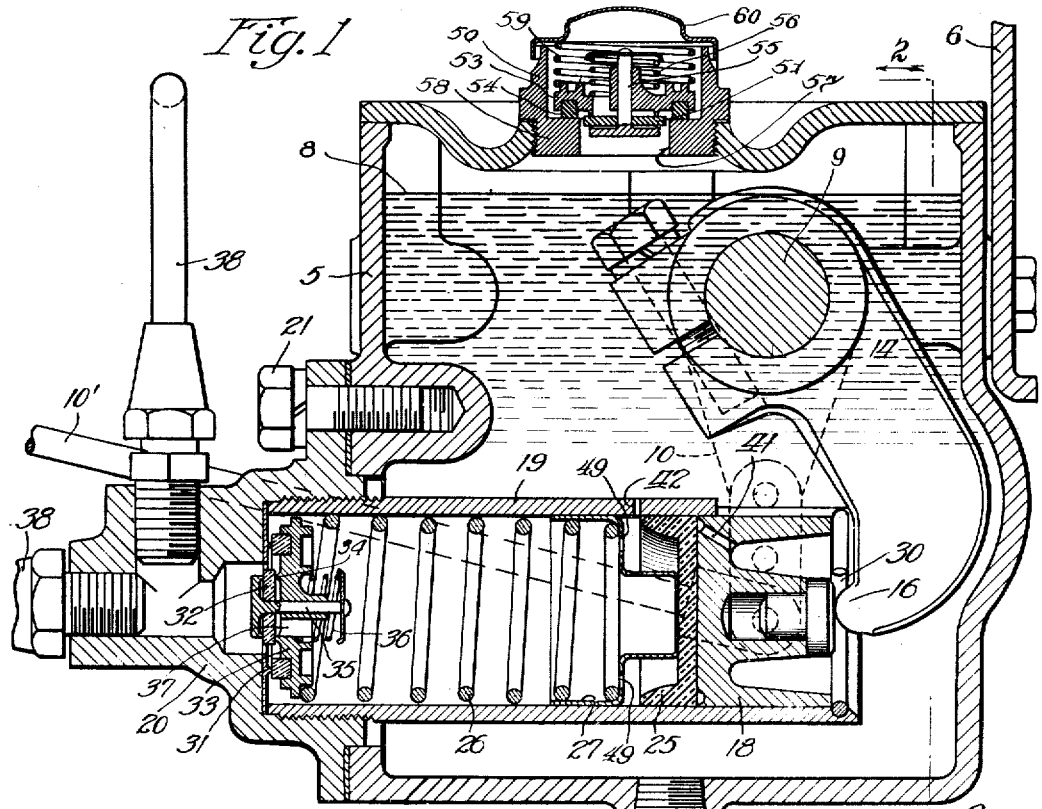
Figure 2:
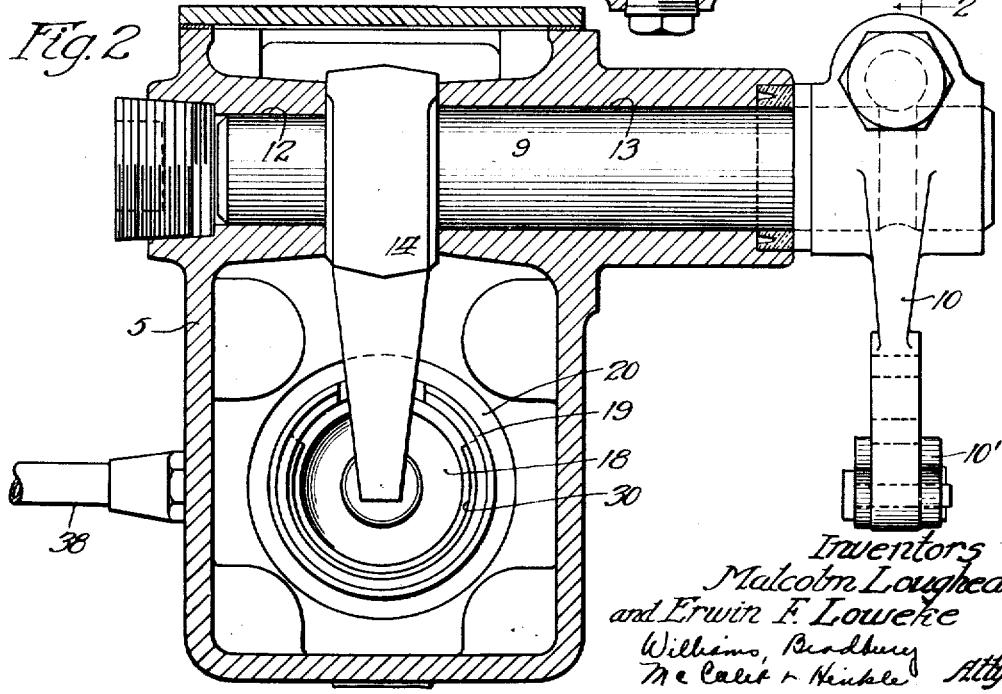

The present invention constitutes an improvement over that shown in the co-pending application of Malcolm Loughead and Erwin F. Loweke, Serial No. 147,859 filed November 12, 1926, now Patent No. 1,707,063, granted March 26, 1929, and is particularly concerned with improving the action of the piston discharge and inlet valves and the simplification of their structure. The foregoing and other objects, features and advantages of the invention are set forth in the following description of a specific embodiment thereof, which is illustrated in the accompanying sheet of drawings, wherein:

Figure 1 is a vertical section through the reservoir and operating cylinder of the pressure producing mechanism, Figure 2 is a vertical section through the pressure producing mechanism taken on the line 2—2 of Figure 1 and, Figure 3 is a fragmentary view of a wheel brake cylinder assembly, parts thereof in section.

Referring to the drawings, the housing 5 is suitably attached to an automobile cross frame member 6 and constitutes a reservoir which under initial conditions stands full of liquid to about the level as indicated at 8. An operating shaft 9 carrying an external lever 10, to which a link 10' may be attached extending to the foot brake pedal of an automobile, is journaled at 12 and 13. A lever 14 is secured to the shaft 9 within the housing 5 and has a hook portion 16 serving to transfer the rotary motion of the shaft 9 to the piston 18 operating within the cylinder 19.

The cylinder 19 is suitably mounted upon a head 20 which is attached to the body 5 by means of four bolts such as 21. Leakage past the piston 18 is prevented by a rubber cup washer 25 which is held against the piston 18 by means of a spring 26 and metallic cup 27, the pressure of the spring 26 being light for the purpose to be hereinafter described. Within a groove at the inner end of the cylinder 19 is a C-spring 30 against which the piston 18 normally abuts within the cylinder 19.

The other or outer end of the piston return spring 26 abuts an inlet valve member 33 and urges it against the head 20 into contact with its seat 31 which may conveniently be a disc of metal inserted between the head 20 and the end of the cylinder 19 and provided with an annular knife edge seat for engaging a suitable annular gasket in the valve member 33. The valve member 33 being thus urged to its seat by the strength of the light spring 26, becomes a loaded inlet valve. The valve member 33 in turn incorporates a centrally located valve seat 34 which engages a rubber or fibre disc valve 32 which is urged against the seat 34 by a mushroom stem 35 which extends through the valve member 33 and at the rear side thereof is engaged by a very light spring 36. Suitable passageways 37 are provided through the wall of the valve member 33 to provide communication between the seat 34 and the interior of the cylinder. The valve 32 acts as a discharge valve for the cylinder, permitting free flow of liquid out of the compressor. In order to obviate the leakage of liquid back to the cylinder through the opening of the disc valve 32 through which the mushroom stem 35 passes, the head of the latter is preferably provided with an annular seat which contacts the outer face of the disc valve 32, to form an additional seal. Through these two check valves 33 and 32 the cylinder 19 communicates with the high pressure tubes 38 leading from the head 20 to the several wheel cylinders which actuate the brakes.

The strength of the piston return spring 26 is preferably such that it loads the inlet check valve 33 to maintain a pressure of 10 pounds per square inch in the conduits when the piston is in its normal retracted position. The spring 26 acts both to return the piston and to close the inlet check valve so that the pressure exerted by the spring against the inlet check valve is always the same as that exerted by the spring against the piston. This pressure of course varies with the degree of compression of the spring during the different positions of the piston. By making the effective area of the inlet check valve less than the area of the piston a positive pressure is always maintained in the conduits regardless of the position of the piston and the degree of compression of the spring 26 or any variation in strength of the spring 26 such as normally occur in large scale commercial production.

The strength and flexibility of the rubber cup washer 25 are such that the suction created in the cylinder 19 is great enough to cause the cup washer 25 to yield to let the fluid slip past it from the reservoir of the case 5 into the interior of the cylinder by way of obliquely arranged ducts 41, and through the metal cup 27 by way of ducts 49.

The effect of this arrangement is that if the return springs 51' for the brake cylinders 52 fail to function quickly the piston 18 will be urged to its normal position but instead of creating a negative pressure in the fluid lines or wheel cylinders, the suction will be relieved wholly from the reservoir. Similarly, if the return springs 51' at the wheel cylinders 52 build up a pressure of, say, ten pounds in the lines, the suction in the master cylinder 19 will be relieved partly through the valve 33 and partly past the cup washer 25, still maintaining a slight positive pressure in the wheel cylinders and pressure lines. In ordinary operations, however, the return springs 51' at the wheel cylinders act forcibly and quickly enough to overbalance the check valve 33 and replace fluid into the master cylinder so that very little, if any fluid slips past the cup washer 25.

As a further assurance that the system will be fully replenished at the completion of each application of the brakes, a port 42 is drilled through the top wall of the cylinder 19 to communicate with the cylinder just within the feather edge of the cup washer 25 when the piston is returned to its normal position as defined by the C-spring 30. An additional function of the port 42 is to permit the egress of fluid from the cylinder 19. In case the wheel cylinders are sluggish in returning the previously displaced fluid to the cylinder and the suction caused by the piston return spring 26 is relieved by the fluid slipping past the cup washer 25 or drawn in through the port 42, the result is that, when the previously displaced fluid is finally returned from the wheel cylinders, there will be too much fluid in the system. The port 42 will then permit the excess to return to the reservoir. In a similar way the port 42 will also return to the reservoir any excess in the volume of liquid in the cylinder which might develop for other reasons, such as expansion due to temperature variations.

Conversely the compressor will replenish the system to compensate for volumetric insufficiencies in the system which may be due to leakage, decreases in temperature, the lengthening of the effective fluid column to follow the wheel cylinder pistons in a type of automatic or manually operated take-up mechanism for the brakes which gradually progresses the normal retractile position of the wheel cylinder pistons—or from other causes.

A double check valve designated in general by the numeral 50, is provided in the cover of the container 5 and is of the same construction and operating principles as the check valves 33, 32 which are provided in the head 20 of the cylinder 19. Check valve 50 comprises an intake check valve 51 which is similar to the fibre disc valve 32 and a mushroom stem 55 is provided which extends through a valve member 53 and the rear side thereof is engaged by a very light spring 56. The valve 53 is provided with an annular seat member 54 which engages a shoulder 58 provided in the wall of the check valve 50. An aperture 57 is provided in the lower part of the check valve 50 through which the valve 51 and stem 55 function. The valve 53 is held in operative engagement with the shoulder 58 by means of a light compression spring 59 which is in active engagement with the valve 53 and a light perforated metal cap 60 of the valve 50. The cap 60 is retained upon the valve 50 by a pressure fit or any other suitable means. Upon the application of the brakes, air is drawn into the reservoir 5 through the intake valve 51 which operates in a similar manner to the valve 32 hereinbefore described. Upon releasing the brakes and the retiring of the piston 18, the air is compressed in the space between the cover of the container 5 and the top of the liquid, the amount of pressure created being dependent upon the liquid level and the distance the piston 18 travels during the operation of the brakes. The cover of the reservoir is so designed as to give sufficient air space to handle the additional volume of air drawn into the valve 51 by normal application of the brakes. The strength of the spring 59 is sufficient to maintain the valve 53 in a seated position against the shoulder 58, against a pressure up to five pounds per square inch. If, however, due to the increase in temperature or other causes, the pressure exceeds five pounds per square inch, the outlet valve 53 will open and this pressure will be relieved.

The described double check valve prevents the loss of the alcohol contained in the fluid used due to evaporation. It is obvious that an ordinary filler plug having a vent therein would emit a considerable quantity of air every time the brakes were released and the piston 18 returned to its normal position. This air would carry with it a considerable charge of alcoholic vapor used in the fluid. It is obvious that a series of braking applications would soon tend to exhaust the alcohol from the container and this is prevented by the double check valve 50.

The fluid brake apparatus here described thus guards the liquid or non-compressible fluid system against the ingress of a compressible fluid—air—by maintaining the pressure lines and the wheel cylinders under a slight positive pressure and by immersing the master cylinder in a reservoir of the liquid medium to provide a liquid seal for the cylinders where it might otherwise suck in air. The apparatus shown also, as previously pointed out, automatically maintains the liquid system at its correct volume and compensates for both increases and decreases in the required liquid volume.

The apparatus just described is also used as a bleeder system for eliminating any air which might get into the pressure lines or wheel cylinders. Upon original installation of this device the fluid must necessarily be pumped into the pressure lines and wheel cylinders 52 and this is accomplished by using the apparatus described as a pump for injecting the fluid. Air bleeder valves 50' are provided at the high points of the system. That is, they are mounted at the wheel cylinders 52. As the fluid is injected into the pressure lines, any air in the system is forced out through these bleeder valves. The installer can determine by previous experience just how many strokes are necessary to completely fill the system and allow a bit of surplus to be extruded. Any air which might enter the system through leakage of the pressure lines in repairing the system or other causes, is ejected through these bleeder valves 50' and by this bleeder system.

Attention is also directed to the obvious advantages of the structural features of the design of compressor illustrated in the drawings. The cylinder assembly is readily detachable from the casing without removing the casing from its support or disconnecting the linkage to the brake pedal. The cylinder itself may be formed from stock tubing, and the check valve assembly readily lends itself to quantity production.

The valve structure is quite inexpensive to manufacture and does not require working close to dimensions nor individual fitting. This feature, together with the ease with which the valve may be removed from the cylinder, makes it entirely feasible to substitute a new valve structure very readily in case the old one gives any trouble. This design of valve also allows a comparatively large diameter for the valve so that the parts may be made rugged and of sufficient size so that delicate workmanship or adjustment is not required. There are minimum of moving parts in the compressor and of these, the only parts which would be likely to be impaired by wear over a period of several years, would be the cup washer 25 and the gaskets of the valve structure. As the cup washer and the gaskets are inexpensive units not attached to any other parts, their replacement is a very simple matter.

While but this one specific embodiment of the present invention is illustrated in this specification, it is contemplated that many changes may be made without departing from the scope or spirit of the invention.

We claim:

1. A liquid compressor for a hydraulic braking system comprising a cylinder, a piston slidable in one end of the cylinder, means for actuating the piston, an outwardly seating inlet check valve disposed in the other end of the cylinder, a spring disposed within the cylinder and between the piston and valve for retracting the piston and loading the valve, a discharge check valve for the cylinder, and means for interconnecting the valves with the hydraulically actuated brakes.

2. A liquid compressor for a hydraulic braking system comprising a cylinder, a piston slidable in one end of the cylinder, means for actuating the piston, an outwardly seating inlet check valve disposed in the other end of the cylinder, a spring disposed within the cylinder and between the piston and valve for retracting the piston and loading the valve, a discharge check valve mounted on the first valve, and means for interconnecting the valves with the hydraulically actuated brakes.

3. A liquid compressor for a hydraulic brake system comprising a cylinder, a piston therein, means for actuating the piston, a cylinder head, an annular valve seat therein for liquid communication with the fluid system, an annular valve member guided by the cylinder bore and seating against the valve seat, a spring interposed between the valve member and the piston to load said valve member, a second annular valve seat formed in the valve member, and a mushroom valve therefor, the stem of which is journalled in the valve member.

4. Combination of a liquid compressor for a hydraulic braking system mounted in a liquid container, comprising a cylinder, a piston slidable in one end of the cylinder, means for actuating the piston and an outwardly seating inlet check valve disposed in the other end of the cylinder, a spring disposed within the cylinder and between the piston and valve for retracting the piston and loading the valve, a discharge check valve for the cylinder, means for interconnecting the valves with the hydraulically actuated brakes, together with means for permitting the ingress of air into the liquid container at a predetermined pressure, and means for permitting the egress of air from the container, at a different predetermined pressure.

5. In a liquid compressor for a hydraulic braking system mounted in a container for liquid, an inlet and outlet valve comprising an outlet valve which permits a flow of fluid from the container to the system, and an inlet valve which permits a flow of fluid from the system to said container, a second inlet and outlet valve mounted in said container comprising means to permit the ingress of atmosphere to the container upon operation of the first mentioned outlet valve, and means to prevent the egress of atmosphere from the container until a predetermined pressure is created within the container.

6. A compressor for a hydraulic braking system comprising a cylinder, a piston slidable therein, a liquid reservoir, an outlet check valve for the cylinder, a loaded inlet check valve for the cylinder, a spring for positively retracting the piston, and a port communicating between the reservoir and the cylinder and uncovered by the piston when in its normally retracted position.

7. A compressor for a hydraulic braking system comprising a cylinder, a piston slidable therein, a liquid reservoir, means for actuating the piston, a discharge valve and a loaded inlet valve for the cylinder for connecting it with the hydraulically operated brakes, and a positive retractile spring for the piston, the piston comprising a cup washer adapted to permit the passage of liquid into the cylinder from the reservoir, the strength of the piston retractile spring and the capacity of the piston for thus permitting the slippage of liquid being such that suction created by the retractile spring will be relieved by liquid slippage past the piston cup washer before the loaded inlet check valve is opened, whereby the compressor is prevented from creating a negative pressure on the system with which it is connected.

8. A compressor for a hydraulic braking system comprising a cylinder, a piston slidable therein, a liquid reservoir, means actuating the piston, a discharge valve and a loaded inlet valve for the cylinder for connecting it with the hydraulically operated brakes, a positive retractile spring for the piston, the piston comprising a cup washer adapted to permit the passage of liquid into the cylinder from the reservoir, a port in the cylinder wall inter-connecting the cylinder and the reservoir and uncovered by the cupwasher when the piston is returned to its normal position, the strength of the piston retractile spring and the capacity of the piston for thus permiting the slippage of liquid being such that suction created by the retractile spring will be relieved by liquid slippage past the piston cup washer before the loaded inlet check valve is opened, whereby the compressor is prevented from creating a negative pressure on the system with which it is connected.

9. The combination with the liquid pressure lines of a hydraulically actuated braking apparatus, of a liquid compressor therefor comprising a cylinder, a check valved discharge port from the cylinder to the pressure lines, an inlet port from the lines to the cylinder, a loaded check valve therein, a liquid reservoir, a piston slidable in the cylinder, mechanical means for retracting the piston, and means constituting in effect a check valve controlling communication from the reservoir to the cylinder, which means operates to admit liquid to the cylinder under a lesser suction than that required to open the loaded check valve.

10. The combination with the liquid pressure lines of a hydraulically actuated braking apparatus, of a liquid compressor therefor comprising a cylinder, a check valved discharge port from the cylinder to the pressure lines, an inlet port from the lines to the cylinder, a loaded check valve therein, a liquid reservoir, a piston slidable in the cylinder, mechanical means for retracting the piston, means constituting in effect a check valve controlling communication from the reservoir to the cylinder, which means operates to admit liquid to the cylinder under a lesser suction than that required to open the loaded check valve, and means operative when the piston is in its retracted position for permitting egress, of liquid from the cylinder to the reservoir.

11. A liquid compressor for a hydraulically actuated braking system comprising a cylinder having a discharge port communicating with the hydraulically actuated brakes and incorporating means permitting the discharge of the liquid from the cylinder but permitting its recession only under a pressure differential, a piston for the cylinder, retractile means for the piston, a liquid reservoir, and means forming a communication between the reservoir and the cylinder only when the piston is in its retracted position and additional means permitting the flow of liquid from the reservoir into the cylinder.

12. A compressor for a hydraulic braking system comprising a reservoir for liquid medium, a cylinder, a piston therefor, rearwardly sealed from atmosphere by the liquid in the reservoir, means for maintaining a slight positive pressure in those portions of the system beyond the master cylinder, pedal controlled means for advancing the piston, mechanical means for retracting the piston, and communicating means from the reservoir to the master cylinder for relieving slight suction therein.

13. A liquid compressor for a hydraulically actuated braking system comprising a cylinder having a discharge port communicating with the hydraulically actuated brakes and incorporating means permitting the discharge of liquid from the cylinder but permitting its recession only under a pressure differential, a piston for the cylinder, retractile means for the piston, a liquid reservoir, and means forming a communication between the reservoir and the cylinder only when the piston is in its retracted position, and additional means permitting the flow of liquid from the reservoir into the cylinder during the retractile movement of the piston.

14. In a hydraulic brake system, a compressor for building up fluid pressure, a fluid motor actuated by said fluid pressure, a conduit interconnecting the compressor and the fluid motor, and means for resisting the flow of fluid upon its return to said compressor to maintain a slight fluid pressure in the fluid motor.

15. In a hydraulic brake system, a compressor for building up fluid pressure, a fluid motor including a piston movable by the pressure of the fluid from said compressor and means interposed between the compresser and motor for limiting the decrease of pressure in the motor when the pressure in the compressor is decreased, said means automatically operated upon each operation of the brake system.

16. In a hydraulic brake system, a compressor for building up fluid pressure, a fluid motor having a piston movable responsive to fluid pressure from said compressor and means including a valve for maintaining at all times slight positive fluid pressure in said fluid motor.

17. In a fluid compressor, a cylinder, a piston movable in the cylinder, and said cylinder having an outlet for connection with apparatus actuated by the fluid pressure, a valve for resisting the return flow of fluid to said cylinder from said outlet, and a spring for actuating said valve, the force exerted by said spring upon said valve being determinable by the position of the piston in said cylinder.

18. In a hydraulic brake system, a fluid supply reservoir, a master cylinder for producing a fluid pressure, a fluid motor responsive to said pressure and means for maintaining a higher pressure in the fluid motor than that produced by the static pressure of the fluid in the supply reservoir.

19. In a hydraulic braking system a compressor comprising a reservoir for reserve liquid, a cylinder communicating therewith, a conduit connecting said cylinder with brake mechanism, valve means including a loaded inlet valve interposed between said cylinder and said conduit, a piston member reciprocable in the cylinder, a sealing cup washer therefor constituting a check valve for permitting the passage of liquid from the reservoir into the interior of the cylinder, pedal controlled means for advancing the piston, and independent mechanical means for retracting the piston.

In witness whereof, we hereunto subscribe our names this 16th day of June, 1926.

MALCOLM LOUGHEAD.
ERWIN F. LOWEKE.